No. 851,732. PATENTED APR. 30, 1907.
A. DESCHAMBAULT.
STONE PULLER.
APPLICATION FILED OCT. 24, 1906.
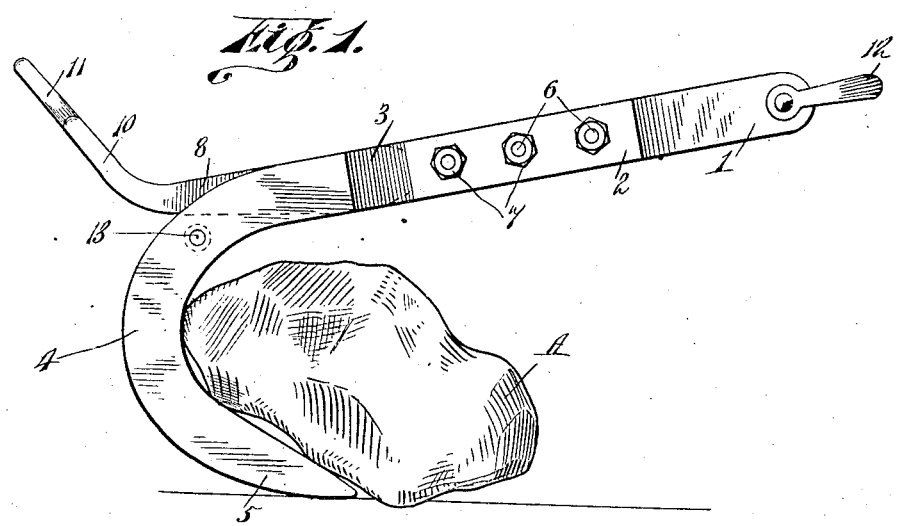
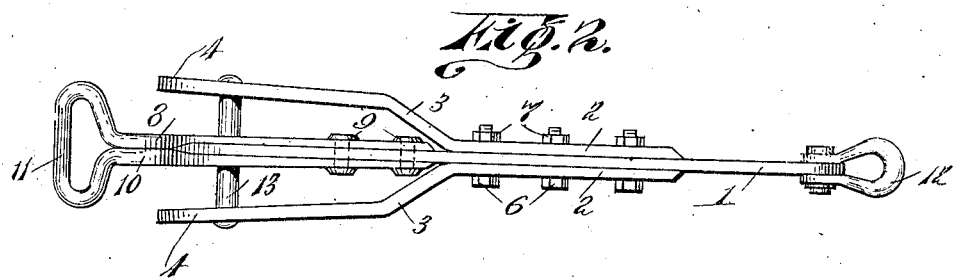
Witnesses:
Eugene McSliney.
C. Cousins
Alfred Deschambault.
Inventor,
By Marion & Marion
Attorneys

UNITED STATES PATENT OFFICE.

ALFRED DESCHAMBAULT, OF WHITEWOOD, SASKATCHEWAN, CANADA.

STONE-PULLER.

No. 851,732.　　　　Specification of Letters Patent.　　Patented April 30, 1907.

Application filed October 24, 1906. Serial No. 340,320.

*To all whom it may concern:*

Be it known that I, ALFRED DESCHAMBAULT, a subject of the King of Great Britain, residing at Whitewood, in the Province of Saskatchewan, Canada, have invented certain new and useful Improvements in Stone-Pullers; and I do hereby declare that the following is a full, clear, and exact description of the invention, such as will enable others skilled in the art to which it appertains to make and use the same.

My invention relates to stone pullers; the object of my invention is to provide a device of this character with the line of draft along its center, and to provide a handle in its center, so that it may be guided by one hand; a further object is to provide a construction by means of which a broken tine may be easily removed and a new one replaced in its stead; and, my invention consists of the construction, combination and arrangement of parts, as herein illustrated, described and claimed.

In the accompanying drawings, forming part of this application, I have illustrated one form of embodiment of my invention, in which drawings similar reference characters designate corresponding parts, and in which:

Figure 1 is a side elevation; and, Fig. 2 is a plan view.

Referring to the drawings, 1 designates a central bar, against which are placed on either side side bars 2, provided with outwardly bent portions 3 and rearwardly extending diverging arms 4. All of said bars are bent downward and forward to form the tines 5. The side bars are removably secured to the central bar by means of the bolts 6 and nuts 7, so that in case of one of the tines being broken, it may easily be removed and repaired, or a new one substituted.

A bifurcated member 8, by means of the rivets 9, is secured to the central bar 1, immediately to the rear of the point at which the side bars 2 are secured to the central bar. The bifurcated member 8 is provided with an upward extension 10 terminating in an integral handle 11. The handle being central of the implement, the implement may be easily guided with one hand, while the other hand of the operator handles the reins of the draft animal attached to the implement.

A clevis 12 is secured to the forward end of the central bar 1. A brace 13 is disposed through the tines 5 below the bifurcated member 8.

In the operation of the invention, the implement may be placed beneath a stone A and adjusted to position with one hand by means of the handle 11, while the draft animal may be guided by the other hand of the operator.

Having thus fully described my invention, what I claim as new and desire to secure by Letters Patent, is:—

A stone puller comprising the combination of a central bar, side bars bolted to the central bar, said side bars being bent outward and backward in diverging lines, and all of said bars being bent downward and forward to form tines, a draft attaching member secured on the central bar, a handle secured to the central bar, said central bar, handle and draft attaching member being disposed in the same vertical plane, and a brace disposed through the tines below the handle.

In witness whereof I have hereunto set my hand in the presence of two witnesses.

ALFRED DESCHAMBAULT.

Witnesses:
　JOHN KING,
　W. A. YOUNG.